(12) United States Patent
Kezele et al.

(10) Patent No.: US 10,304,253 B2
(45) Date of Patent: May 28, 2019

(54) COMPUTER PROGRAM, OBJECT TRACKING METHOD, AND DISPLAY DEVICE

(71) Applicant: SEIKO EPSON CORPORATION, Tokyo (JP)

(72) Inventors: Irina Kezele, Richmond Hill (CA); Alex Levinshtein, Vaughan (CA)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/710,148

(22) Filed: Sep. 20, 2017

(65) Prior Publication Data

US 2018/0096534 A1   Apr. 5, 2018

(30) Foreign Application Priority Data

Sep. 30, 2016 (JP) ................................. 2016-193867

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/005* (2013.01);
(Continued)

(58) Field of Classification Search
CPC ......... G06T 19/006; G06T 19/20; G06T 7/30; G06T 7/70
See application file for complete search history.

(56) References Cited

U.S. PATENT DOCUMENTS 8,797,356 B2 * 8/2014 Leung ..................... G06T 7/35
345/633
8,963,951 B2 * 2/2015 Tsurumi ................ H04N 5/144
345/473
(Continued)

FOREIGN PATENT DOCUMENTS

JP    2005-038321 A    2/2005

OTHER PUBLICATIONS

Lepetit et al., "Monocular Model-Based 3D Tracking of Rigid Objects: A Survey" Foundations and Trends in Computer Graphics and Vision, vol. 1, No. 1, pp. 1-89, 2005.
(Continued)

*Primary Examiner* — Ryan R Yang
(74) *Attorney, Agent, or Firm* — Oliff PLC (57) ABSTRACT

A method including acquiring a captured image of an object with a camera, detecting a first pose of the object on the basis of 2D template data and either the captured image at initial time or the captured image at time later than the initial time, detecting a second pose of the object corresponding to the captured image at current time on the basis of the first pose and the captured image at the current time, displaying an AR image in a virtual pose based on the second pose in the case where accuracy of the second pose at the current time falls in a range between a first criterion and a second criterion; and detecting a third pose of the object on the basis of the captured image at the current time and the 2D template data in the case where the accuracy falls in the range.

5 Claims, 9 Drawing Sheets

(51) Int. Cl.
*G06F 3/00* (2006.01)
*G06T 15/20* (2011.01)
*G06F 3/14* (2006.01)
*G06F 3/01* (2006.01)
*G06F 3/0481* (2013.01)
*G06T 7/00* (2017.01)
*G09G 3/00* (2006.01)

(52) U.S. Cl.
CPC .......... *G06F 3/011* (2013.01); *G06F 3/04815* (2013.01); *G06F 3/14* (2013.01); *G06T 7/00* (2013.01); *G06T 15/205* (2013.01); *G02B 2027/014* (2013.01); *G02B 2027/0138* (2013.01); *G02B 2027/0187* (2013.01); *G06T 2207/30* (2013.01); *G09G 3/003* (2013.01)

(56) References Cited

U.S. PATENT DOCUMENTS

| | | | |
|---|---|---|---|
| 2010/0157079 A1* | 6/2010 | Atanassov | G06T 5/50 348/222.1 |
| 2012/0105473 A1 | 5/2012 | Bar-Zeev et al. | |
| 2015/0002542 A1* | 1/2015 | Chan | G06F 3/048 345/633 |
| 2015/0029218 A1 | 1/2015 | Williams et al. | |
| 2015/0310665 A1* | 10/2015 | Michail | G06T 19/006 345/419 |
| 2016/0054793 A1* | 2/2016 | Kasahara | G06F 3/0488 345/633 |

OTHER PUBLICATIONS

Strasdat et al., "Scale Drift-Aware Large Scale Monocular SLAM", In Proceedings of Robotics Science and Sytems (RSS), 2010.
Feb. 13, 2018 European Search Report issued in European Patent Application No. 17193997.8.

* cited by examiner

COMPUTER PROGRAM, OBJECT TRACKING METHOD, AND DISPLAY DEVICE

BACKGROUND

1. Technical Field

The present disclosure relates to tracking of an object.

2. Related Art

There has been known a head-mounted display device (a head mounted display: HMD) mounted on the head of a user. For example, JP-A-2005-38321 (Patent Literature 1) describes a video see-through-type HMD.

SUMMARY

In augmented reality (AR) displayed using an HMD, to realize an impression of a seamless union of a real world and a virtual world, virtual objects are desirably highly accurately superimposed (overlaid) on objects (counterparts) in the real world respectively corresponding to the virtual objects. Such superimposition is called AR superimposition.

A 3D-object tracker used for the AR superimposition desirably accurately estimates positions of a tracked 3D object in respective video frames. Despite the estimation, many factors including disappearance of feature points due to speed of a movement, a change in a visual angle, a motion blur, changes in appearance and illumination conditions, a complicated (scattered) background, and occlusion (shielding) cause errors in the estimation of the 3D positions.

In order to maintain tracking accuracy and continuity of the AR superimposition, these errors are desirably corrected on the site (every time). There are different several approaches for coping with correction of tracking errors. In order to enable application of the approaches at appropriate times, it is desirable to accurately detect points in time when the tracking errors occurred in a period of the object tracking.

A standard 3D tracker defines an effective pose state and a nose lost state. The definition limits the performance of the tracker. That is, the effective pose state is allocated when a state defined in advance for pose verification is satisfied. Strictness of the state may be high or may be low.

When the strictness low, even if a drift amount is a little large, a pose can be marked as effective. That is, even if a pose of a virtual object deviates from a corresponding object, it tends to be determined that the pose is correctly tracked. In this case, reinitialization of the pose is not executed and, on the other hand, display of AR is continued. However, the display of the AR is performed on the basis of a drifted pose.

On the other hand, when the strictness is high, only a slight pose is regarded as effective. That is, a pose is effective only in the case of a slight drift amount. Therefore, a block (i.e., processing) for reinitializing the pose is frequently executed. In a reinitializing process, a large number of video frames (in some case, ten frames or more) are used. During a period of the reinitializing process, the tracker falls into a pose lost state. As a result, the display of the AR stops during the period.

An advantage of some aspects of the disclosure is to reduce, when a pose drifts (deviates), a period in which an AR image having a large drift with respect to an object is presented to a user and/or a period in which the AR image disappears.

The disclosure can be implemented as the following forms.

An aspect of the disclosure is directed to a non-transit computer readable medium that embodies instructions that, when executed by one or more processors in a display device, cause the one or more processors to perform a method includes: acquiring a captured image of an object with a camera; detecting a first pose of the object with respect to the camera on the basis of 2D template data and either the captured image at initial time or the captured image at time later than the initial time; detecting a second pose of the object corresponding to the captured image at current time on the basis of the first pose and the captured image at the current time; displaying, on a display section, an AR image in a virtual pose based on the second pose in the case where accuracy of the second pose corresponding to the captured image at the current time falls in a range between a first criterion and a second criterion; and detecting a third pose of the object on the basis of the captured image at the current time and the 2D template data in the case where the accuracy falls in the range between the first criterion and the second criterion, wherein accuracy represented by the first criterion is more tolerant than that of the second criterion.

According to this form, when the second pose falls below the first criterion, it is possible to continue AR display while detecting the third pose. That is, when accuracy of a derived pose of the object falls below the criterion, reinitialization of the pose is executed and, on the other hand, display of AR can be continued.

In another aspect, the method further includes: stopping displaying the AR image in the case where the accuracy of the second nose falls below a second criterion. According to this configuration, when the second pose falls below the second criterion, it is possible to stop the AR display.

In still another aspect, the display device is a head-mounted display device that includes the camera, the one or more processors and the display section, where the display section includes a display element and an optical element transmitting light from a real scene that allow a user to visually perceive the AR image displayed by the display element to be superimposed on the real scene. The method further includes; displaying the AR image so that the virtual pose of the AR image is visually perceived to be aligned with that of the object in the real scene.

The disclosure can be implemented in various forms other than the forms explained above. The disclosure can be realized in forms of, for example, a tracking method and a display device that performs the method.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
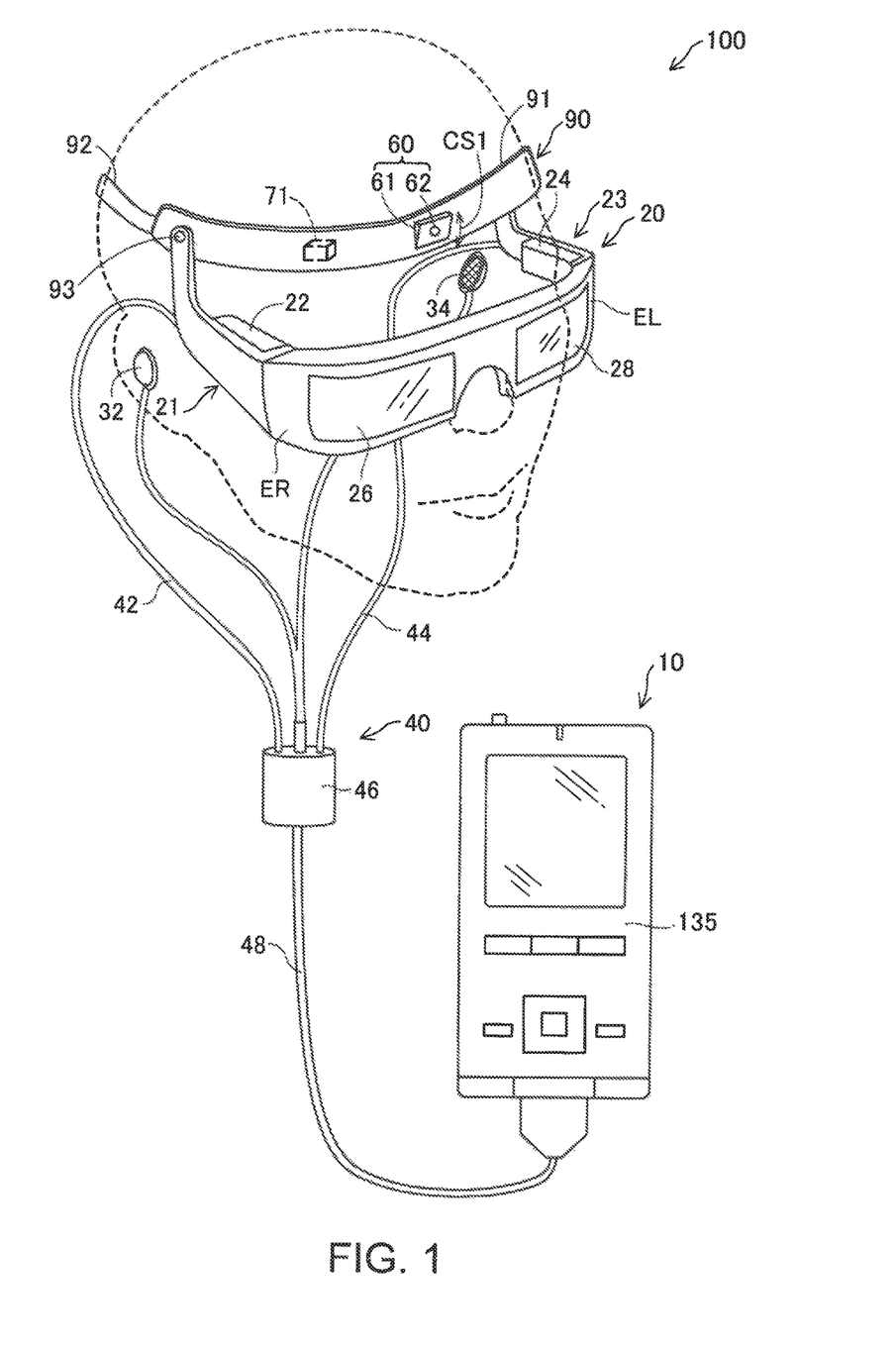
FIG. 1 is a schematic configuration diagram of an HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (inertial Measurement Unit) 71. The wearing base section 91 has a shape curved along the form of the frontal region of a person. The belt 92 is worn around the head of the user.

The camera 60 functions as an imaging section. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base section 61 that rotates with respect to the wearing base section 91 and a lens section 62, a relative position of which is fixed with respect to the camera base section 61. The camera base section 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens section 62, which is the optical axis of the camera 60, can be changed in the range of the arrow CS1. The lens section 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holding section 21, a right display driving section 22, a left holding section 23, a left display driving section 24, a right optical-image display section 26, and a left optical-image display section 28.

The right optical-image display section 26 and the left optical-image display section 28 are located in front of the right eye and the left eye of the user when the user wears the display section 20. One end of the right optical-image display section 26 and one end of the left optical-image display section 28 are connected to each other in a position corresponding to the middle of the forehead of the user when the user wears the display section 20.

The right holding section 21 has a shape extending in a substantial horizontal direction from an end portion ER, which is the other end of the right optical-image display section 26, and inclining obliquely upward halfway. The right holding section 21 connects the end portion ER and a coupling section 93 on the right side of the wearing base section 91.

Similarly, the left holding section 23 has a shape extending in a substantial horizontal direction from an end portion EL, which is the other end of the left optical-image display section 28 and inclining obliquely upward halfway. The left holding section 23 connects the end portion EL and a coupling section (not shown in the figure) on the left side of the wearing base section 91.

The right holding section 21 and the left holding section 23 are coupled to the wearing base section 91 by left and right coupling sections 93 to locate the right optical-image display section 26 and the left optical-image display section 28 in front of the eyes of the user. Note that the coupling sections 93 couple the right holding section 21 and the left holding section 23 to be capable of rotating and capable of being fixed in any rotating positions. As a result, the display section 20 is provided to be capable of rotating with respect to the wearing base section 91.

The right holding section 21 is a member provided to extend from the end portion ER, which is the other end of the right optical-image display section 26, to a position corresponding to the temporal region of the user when the user wears the display section 20.

Similarly, the left holding section 23 is a member provided to extend from the end portion EL, which is the other end of the left optical-image display section 28 to a position corresponding to the temporal region of the user when the user wears the display section 20. The right display driving section 22 and the left display driving section 24 are disposed on a side opposed to the head of the user when the user wears the display section 20.

The display driving sections 22 and 24 include liquid crystal displays 241 and 242 (hereinafter referred to as "LCDs 241 and 242" as well) and projection optical systems 251 and 252 explained below. The configuration of the display driving sections 22 and 24 is explained in detail below.

The optical-image display sections 26 and 28 include light guide plates 261 and 262 and dimming plates explained below. The light guide plates 261 and 262 are formed of a light transmissive resin material or the like and guide image lights output from the display driving sections 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the tight cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
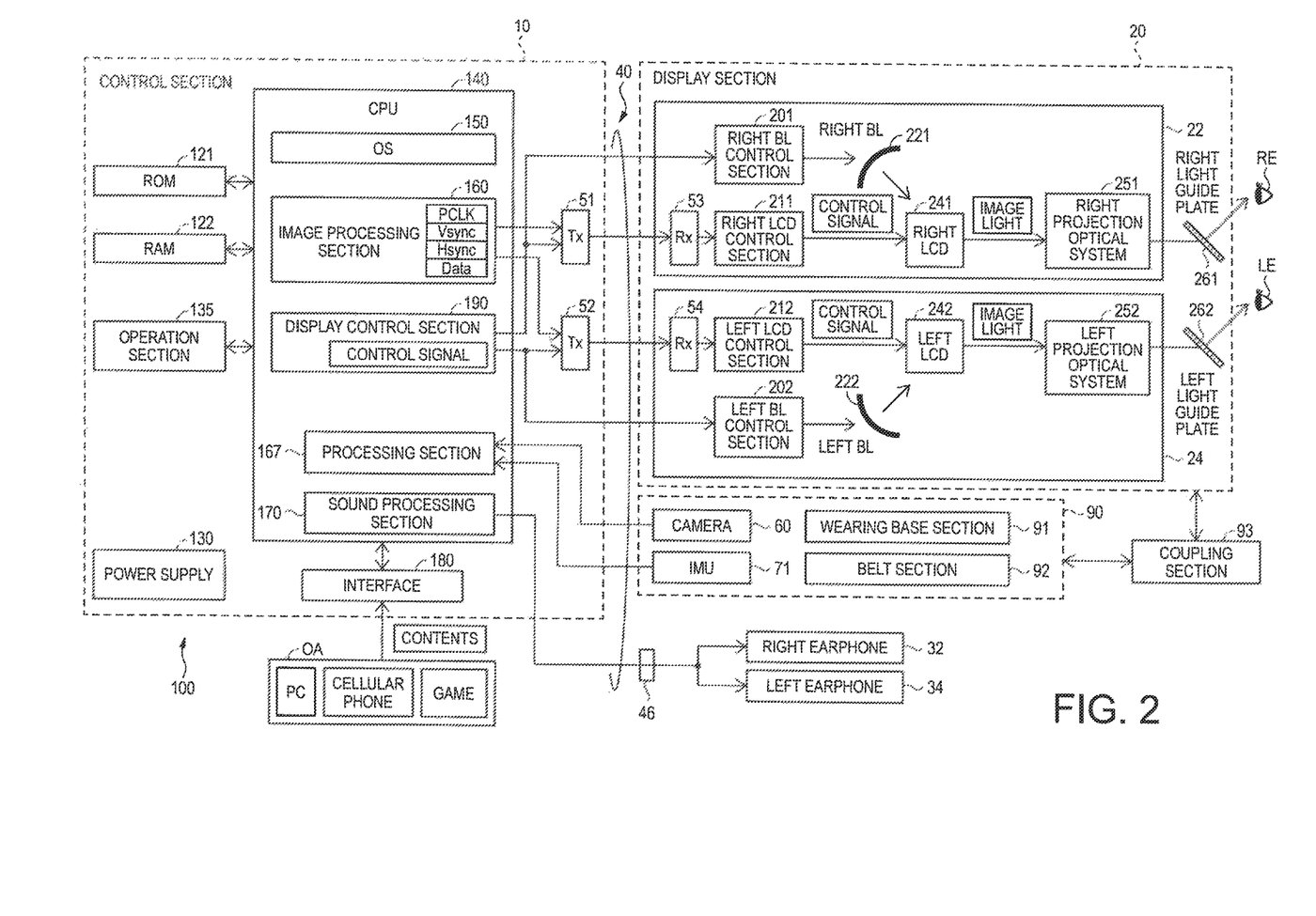
FIG. 2 is a functional block diagram of the HMD.

FIG. 2 is a block diagram functionally showing the configuration of the HMD 100. As shown in FIG. 2, the control section 10 includes a ROM 121, a RAM 122, a power supply 130, the operation section 135, a CPU 140, an interface 180, and a transmitting section 51 (Tx 51) and a transmitting section 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driving section 22 and the left display driving section 24. The display control section 190 controls generation and emission of image lights respectively by the right display driving section 22 and the left display driving section 24.

The display control section 190 transmits control signals to a right LCD control section 211 and a left LCD control section 212 respectively via the transmitting sections 51 and 52. The display control section 190 transmits control signals respectively to a right backlight control section 201 and a left backlight control section 202.

The image processing section 160 acquires an image signal included in contents and transmits the acquired image signal to receiving sections 53 and 54 of the display section 20 via the transmitting sections 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a homography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USE interface, a micro USE interface, and an interface for a memory card can be used.

The display section 20 includes the right display driving section 22, the left display driving section 24, the right light guide plate 261 functioning as the right optical-image display section 26, and the left light guide plate 262 functioning as the left optical-image display section 28. The right and left light guide plates 261 and 262 are optical see-through elements that transmit light from real scene.

The right display driving section 22 includes the receiving section 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driving section 22 may include a self-emitting display element such as an organic EL display element or may include a scan-type display element that scans a light beam from a laser diode on a retina. The same applies to the left display driving section 24.

The receiving section 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels are arranged in a matrix shape.

The right projection optical system 251 is configured by a collimate lens that converts image light emitted from the right LCD 241 into light beams in a parallel state. The right light guide plate 261 functioning as the right optical-image display section 26 guides the image light output from the right protection optical system 251 to the right eye RE of the user while reflecting the image light along a predetermined optical path. Note that the left display driving section 24 has a configuration same as the configuration of the right display driving section 22 and corresponds to the left eye LE of the user. Therefore, explanation of the left display driving section 24 is omitted.

Accuracy of calibration performed using the IMU 71 and the camera 60 is different depending on the performance of the IMU 71, which is the inertial sensor. If an inexpensive IMU not having high accuracy is used, a large error and a large drift sometimes occur in the calibration.

In this embodiment, the calibration is executed according to a batch resolution base algorithm, in which a multi-position method is used, using the IMU 71. In this embodiment, concerning a translational relation between the IMU 71 and the camera 60, design data during manufacturing is used.

Separate calibrations (hereinafter, independent calibrations) are respectively executed on the IMU 71 and the camera 60. As a specific method of the independent calibrations well-known technique is used.

In the independent calibration, the IMU 71 is calibrated. Specifically, concerning a gain/scale, a static bias/an offset, and a skew among three axes, calibrations are executed on three-axis acceleration sensors (Ax, Ay, and Az), three-axis gyro sensors (Gx, Gy, and Gz), and three-axis terrestrial magnetism sensor (Mx, My, and Mz) included in the IMU 71.

When these calibrations are executed, the IMU 71 outputs acceleration, angular velocity, and terrestrial magnetism as output values respectively concerning the acceleration, the angular velocity, and the terrestrial magnetism. The output values are values obtained by correcting the gain, the static bias/the offset, and misalignment among the three axes. In this embodiment, these calibrations are carried out in a manufacturing factory during manufacturing of the HMD 100.

In the calibration of the camera 60 executed in the independent calibrations, internal parameters of the camera 60 including a focal length, a skew, a principal point position, and distortion in the camera 60 are calibrated. A well-known technique can be applied to the calibration of the camera 60.

After the calibrations of the sensors included in the IMU 71 are executed, it is possible to fuse detection values (measured outputs) of the respective sensors for acceleration, angular velocity, and terrestrial magnetism in the IMU 71 and obtain IMU orientation with high accuracy.

An overview of processing characteristic to this embodiment is explained. Details are explained below.

A process of 3D-pose tracking used in AR superimposition includes a detection process and a tracking process following the detection process. When a pose being tracked is lost as a result of occurrence of a large drift (error) in the pose, the detection process is carried out again (reinitialization). In the past, the AR superimposition is stopped until the pose is obtained again by the reinitialization. Therefore, in this embodiment, at a stage of an allowable degree of a drift, the pose detection process (the reinitialization) is started while continuing the AR superimposition.

In a monocular video, tracking a relative movement of a 3D object to the camera 60 includes continuous recovery (for each of frames) of positions (positions represented by six degrees of freedom) of the 3D object with respect to a camera coordinate.

In this embodiment, a 3D model corresponding to a 3D object is known. Therefore, tracking of the 3D object results in the following two problems. A first problem is to establish accurate association between 3D points of the 3D model and 2D points in a video sequence. A second problem is to solve a perspective n-point problem (PnP problem) and estimate a position of the 3D object.

In the following explanation, details of the processing are explained.

Figure 3:
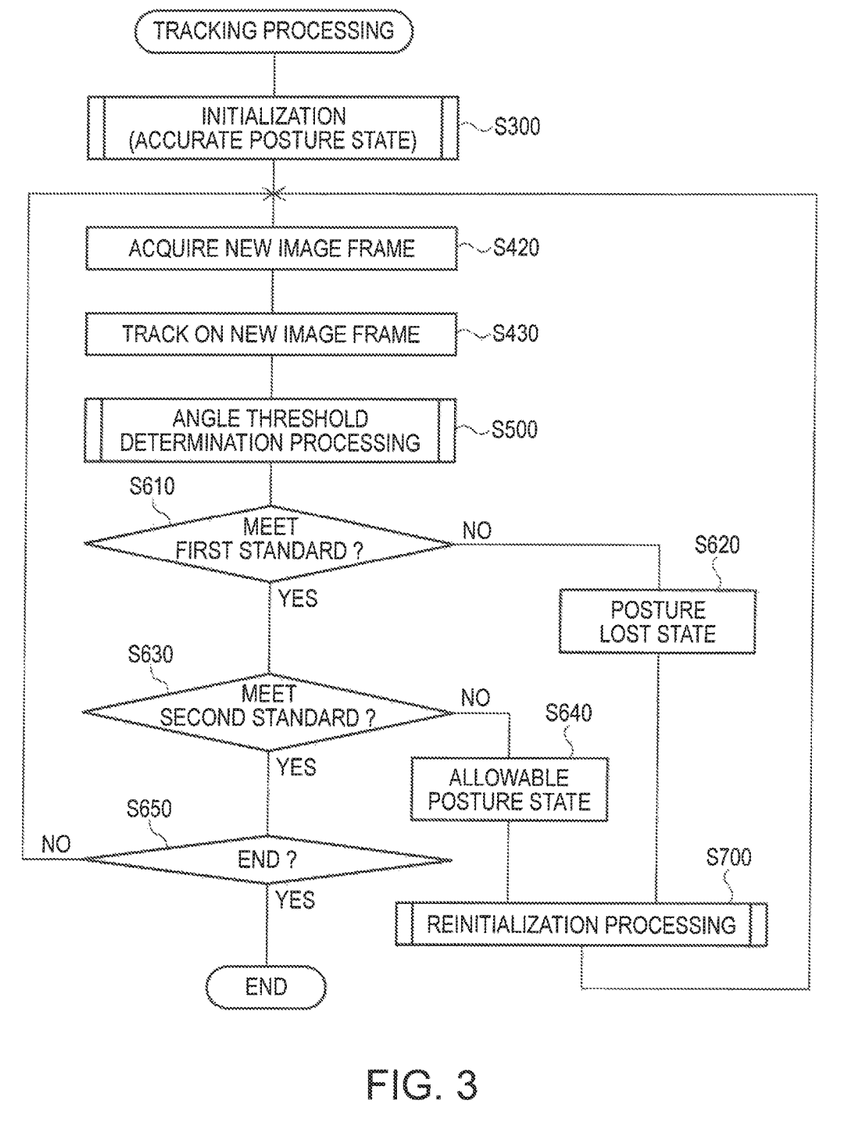
FIG. 3 is a flowchart for explaining tracking processing.

FIG. 3 is a flowchart for explaining tracking processing. An execution entity of steps included an the tracking processing is the CPU 140.

First, the CPU 140 executes initialization (S300). A tracking state changes to an accurate pose state according to the initialization. An accurate pose detected in S300 is referred to as first pose as well. The first pose detected in S300 is detected on the basis of a captured image at initial time. The first pose is a pose with respect to the camera 60.

Figure 4:
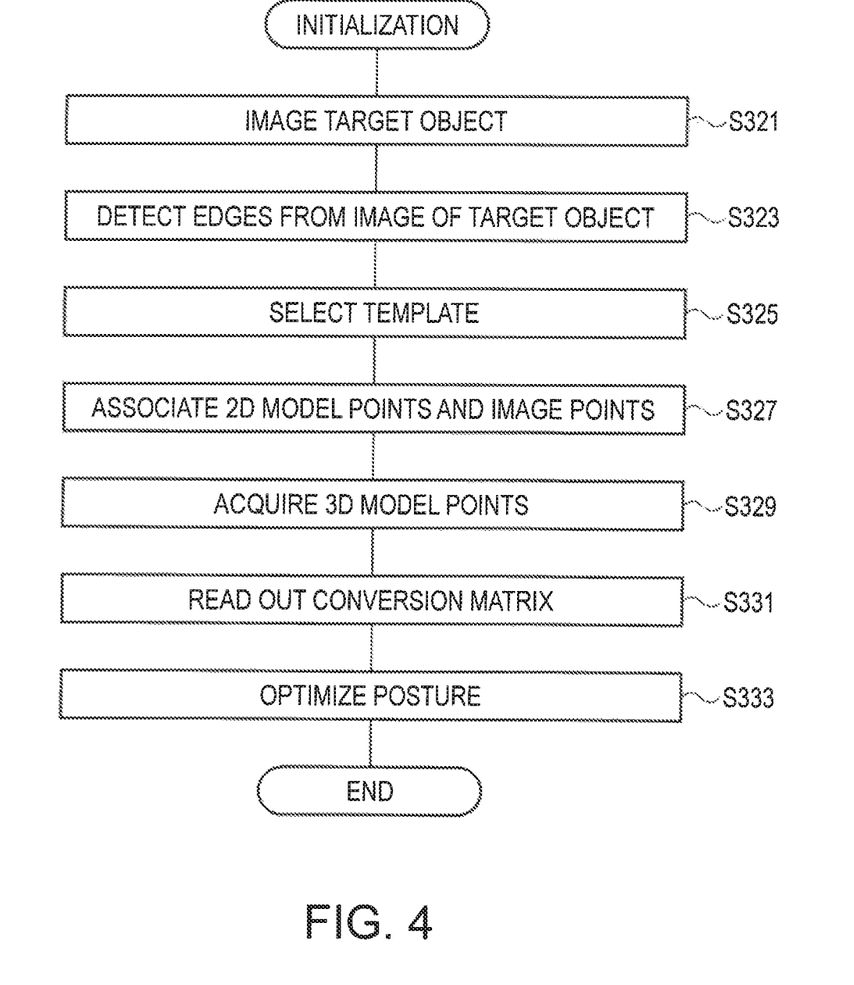
FIG. 4 is a flowchart for explaining initialization.

FIG. 4 is a flowchart of the initialization. First, the CPU 140 images an object using the camera 60 (S321). A background may be included in a captured image. Subsequently, the CPU 140 executes edge detection explained below on the captured image of the object (S323).

The CPU 140 executes step S323 in order to associate the imaged object and a 2D template. The 2D template corresponds to the imaged object and reflects the position and the pose of the object. The control section 10 stores a plurality of 2D templates in advance.

The 2D templates are data created on the basis of respective 2D models obtained by rendering a 3D model corresponding to the object on a virtual image plate on the basis of respective views.

A view includes a three-dimensional rigid body conversion matrix representing rotation and translation with respect to a virtual camera and a perspective mapping (perspective projection) conversion matrix including camera parameters. Specifically, the 2D templates include 2D model points representing feature points (in this embodiment, points included in edges) of the 2D model, 3D model points corresponding to the 2D model points, and the view. The 2D model points are represented by a 2D coordinate system (an image plane coordinate system) having the origin on the image plate. The 3D model points are represented by a 3D coordinate system (a 3D model coordinate system) the origin of which is fixed in the 3D model.

For detection of the edges, feature elements serving as the edges are calculated on the basis of pixels of a captured image. In this embodiment, a gradient of luminance of each of the pixels of the captured image of the object is calculated to determine the feature elements. In this embodiment, in order to detect the edges, in the same manner as a procedure in the canny edge detection method, the edges are simply compared with a threshold and the edges that are not the maximum are suppressed (non-maxima suppression).

Subsequently, the CPU 140 selects, out of the stored plurality of 2D templates, a 2D template generated from a view closest to the pose of the captured image of the object (S325).

For the selection, an existing three-dimensional pose estimation algorithm for estimating a rough pose of the object may be separately used.

However, when an increase in accuracy of a 3D pose is performed, a new view closer to the pose of the image of the object than the already selected view is sometimes found. When a new view is found, an increase in accuracy of a 3D pose of the new view is performed.

Note that, in the other embodiments, it is also possible to, rather than using the 2D templates prepared in advance, image the object and, on the fly and, if necessary, while reflecting an imaging environment such as illumination on the rendering, create 2D templates including 2D models from 3D CAD data to extract as many visually recognizable edges as possible.

Subsequently, the CPU 140 executes association of image points included in the edges of the image of the object and the 2D model points included in the 2D template (S327).

In this embodiment, the CPU 140 calculates similarity scores concerning all the image points included in local vicinities around the respective mapped 2D model points. A well-known method is applied concerning the calculation of the similarity scores.

Subsequently, the CPU 140 acquires 3D model points corresponding to the 2D model points associated with the image Points and information concerning a view at the time when the 2D model points are created (S329).

Subsequently, the CPU 140 reads out a conversion matrix representing the acquired view (S331). The conversion matrix is a three-dimensional rigid body conversion matrix and a perspective mapping (perspective projection) conversion matrix represented by a coordinate system having the camera 60 as the origin.

Finally, the CPU 140 optimizes the pose of the object imaged by the camera 60 (S333). The initialization of the pose is completed by the optimization. Step S333 is repeatedly executed by calculation to derive an optimum rotation matrix and an optimum translation matrix on the oasis of the view acquired in S331.

After the initialization is completed as explained above, the CPU 140 displays an AR image on the display section in a virtual pose corresponding to the first pose. Then, in this embodiment, it is possible to cause the user to visually recognize as if a 3D pose of the AR image coincides with a 3D pose of an object OB. The CPU 140 acquires a new image frame (S420). The new image frame is acquired from continuous imaging by the camera 60. Subsequently, the CPU 140 carries out tracking in the new image frame (S430). The tracking could include optimizing the pose of the object OB in the new image frame.

The CPU 140 executes step S430 on the basis of the first pose and a captured image captured in S420. The captured image captured in S420 is a captured image at the current time. The pose detected in S430 is referred to as second pose as well. Specifically, the second pose can be derived by treating, like one 2D template, data including the pose (the first pose) derived by the initialization and 2D model points and 3D model points corresponding to the first pose.

Subsequently, the CPU 140 executes residual angle determination processing (explained below) (S500) and determines whether a tracking state meets a first criterion (a first level) (S610). That is, the CPU 140 determines whether accuracy of a pose at the current time meets the first criterion. In other words, the CPU 140 determines whether accuracy of the second pose corresponding to the captured image at the current time meets the first criterion.

Figure 5:
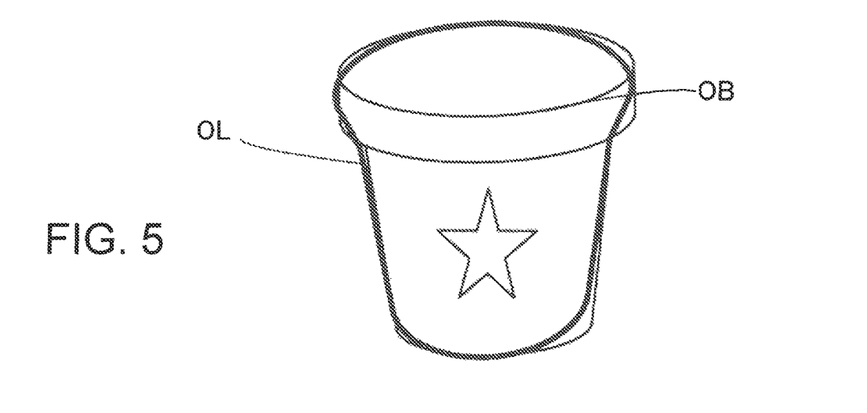
FIG. 5 is a diagram showing an accurate pose state.
Figure 6:
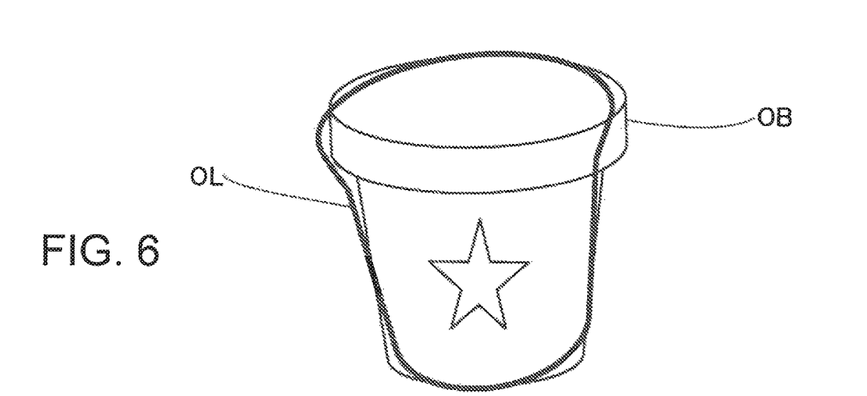
FIG. 6 is a diagram showing an allowable pose state.
Figure 7:
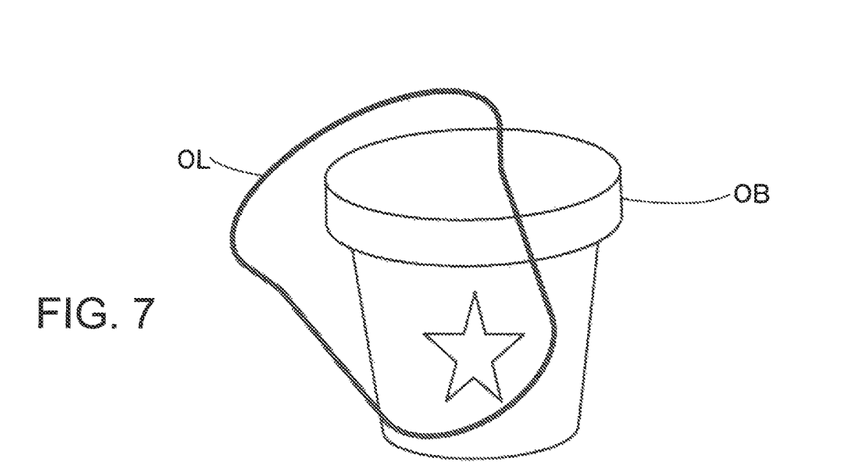
FIG. 7 is a diagram showing a pose lost state.

As the tracking state, in addition to the accurate pose state explained above, there are an allowable pose state and a pose lost state. FIGS. 5, 6, and 7 show a positional relation between the object OB and a contour OL. The contour OL is displayed as AR. The contour OL is determined by rendering a 3D model on the basis of a tracked pose.

FIG. 5 illustrates the accurate pose state. FIG. 6 illustrates the allowable pose state. FIG. 7 illustrates the pose lost state. In this embodiment, the following two states (levels) are allowed as an effective pose state. A first state is the accurate pose state. A second state is the allowable pose state. This brings about a three-state tracker shown in FIGS. 5, 6, and 7. Pose verification based on two criteria are used to distinguish three states.

Step S610 is a step for testing whether a pose is allowable using a first criterion (a first level: PLPV: First Level pose Value) of the pose verification. Step S630 explained below is a step for determining accuracy of a pose using a second criterion (a second level: SLPV: Second Level pose Value) of the pose verification. Therefore, the second criterion is a criterion stricter (more accurate) than the first criterion. That is, the first criterion is a criterion more tolerant than the second criterion.

The three-state tracker has at least the following two advantages. A first advantage is that the three-state tracker has continuity in tracking. When the first criterion (FLPV) is recognized, the tracker is maintained in the allowable pose state instead of the pose lost state in the reinitialization. As a result, as explained below together with AR display processing (FIG. 11), when the first criterion is recognized, the tracker continues display of AR.

A second advantage is that there is possibility that two different correction methods are adopted depending on a level of effectiveness (allowable accuracy) of a pose. That is, there is possibility that the correction methods are adopted according to types (degrees) of errors.

In the FLPV 3D position verification process and the SLPV 3D position verification process explained above, a variety of approaches can be adopted. For example, concerning 3D object tracking by a monocular camera in this embodiment, the variety of approaches are a remapping error, an inlier total number (count)/ratio (fraction) in a perspective n point (PnP), and the like.

In this embodiment, in S610 and S630, a global residual angle error (hereinafter, residual angle error) of PnP estimation for drift detection is used. In other forms, a combination of the residual angle error and the PnP inlier/fraction can also be used. The residual angle error is a measured criterion.

Figure 8:
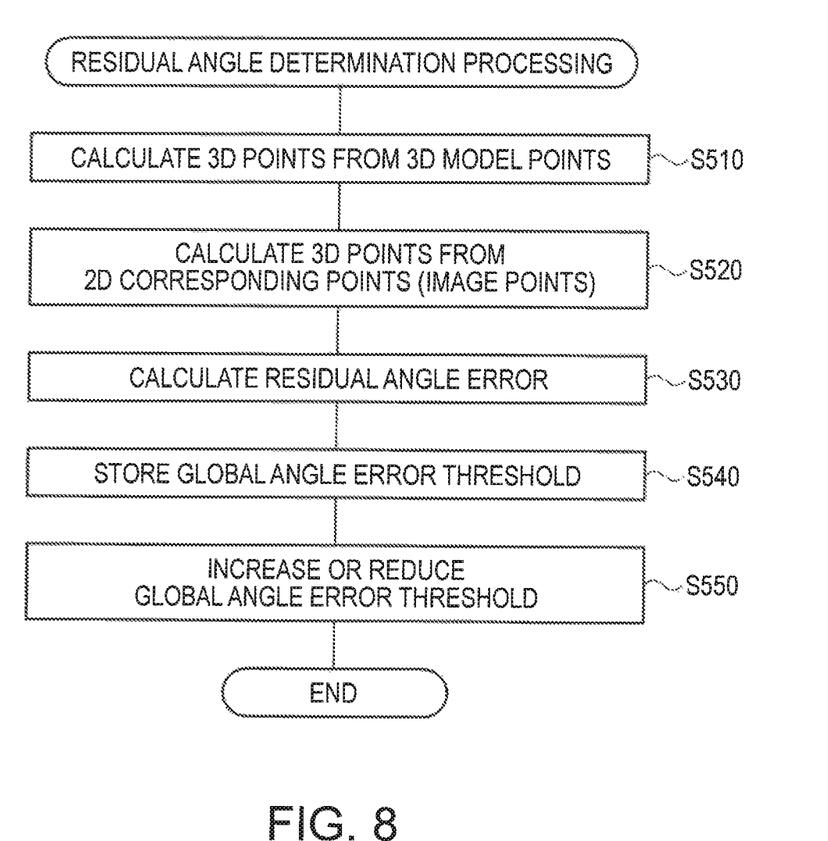
FIG. 8 is a flowchart for explaining residual angle determination processing.
Figure 9:
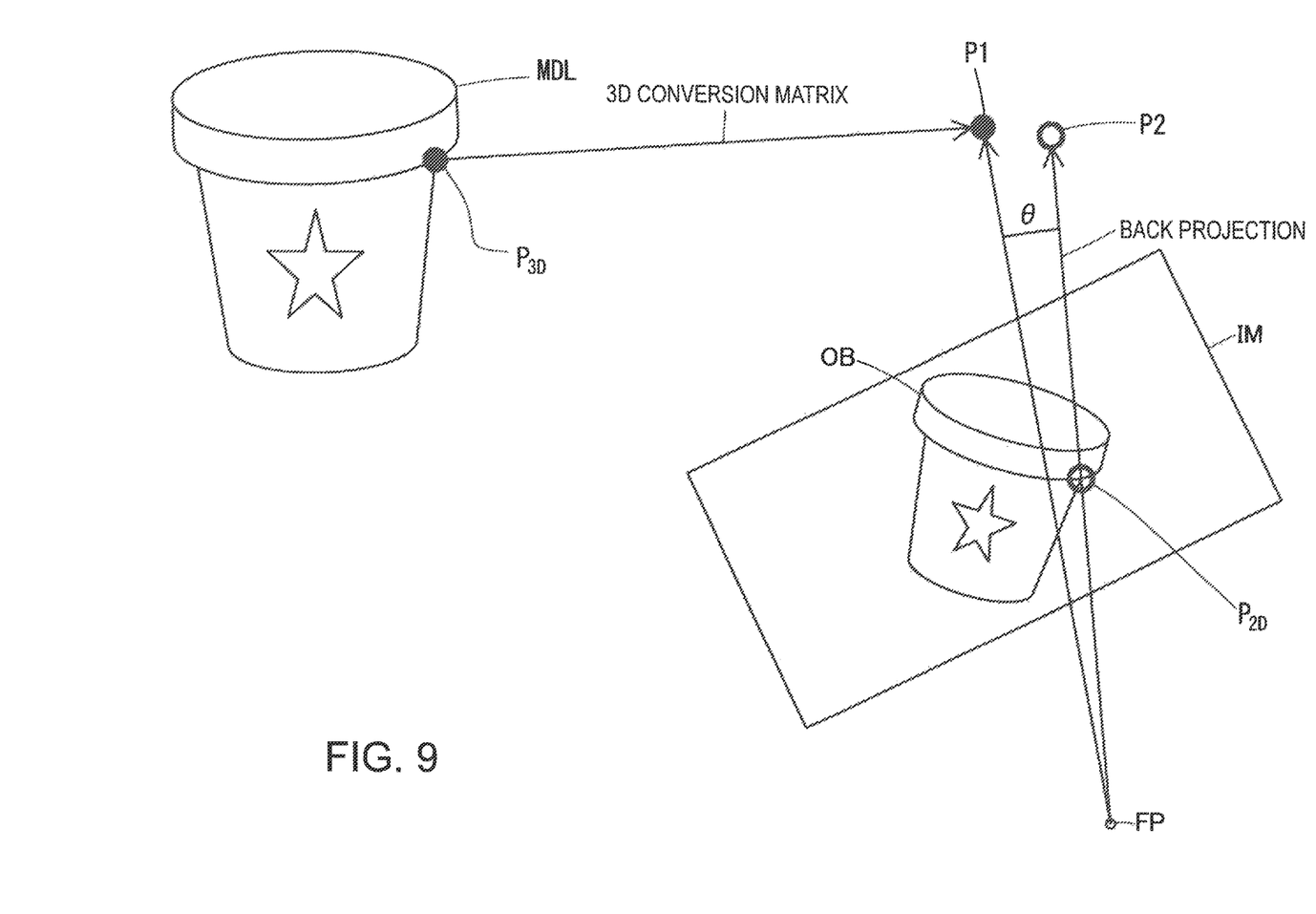
FIG. 9 is a diagram showing a residual angle error.

FIG. 8 is a flowchart for explaining residual angle determination processing. The residual angle determination processing is used for a verification process in which the residual angle error is used. FIG. 9 shows a residual angle error $\theta$. As explained below, the residual angle error $\theta$ is calculated in the verification process.

First, in an exit of a procedure for solving the PnP problem, the CPU 140 calculates a first 3D point P1 (S510). The first 3D point P1 is a point obtained by converting a 3D model point. $P_{3D}$ included in a 3D model MDL. The conversion is realized by converting the 3D model point $P_{3D}$ represented by a 3D model coordinate system into a camera coordinate system using a 3D conversion matrix [R|T] representing a pose corresponding to a current video (image) frame. 3D conversion matrix [R|T] is a matrix of the current time (a current image frame) related to PnP that causes estimation of a 3D position of the object OB. R represents a rotational component of the matrix. T represents a translational component of the matrix.

Subsequently, the CPU 140 calculates a second 3D point P2 (S520). The second 3D point P2 is a point calculated by back projection (3D back mapping) of a 2D corresponding point (image point) $P_{2D}$ related to an analysis of a video frame. In this case, depth information only has to be based on a Z coordinate of a 3D model point corresponding to the image point.

Note that, as explained below, the 3D point P2 is calculated in order to calculate a residual angle error in S530. In the other embodiments, in order to calculate the residual angle error, it is sufficient to calculate, in S520, a straight line passing the 2D corresponding point $P_{2D}$ and a focal point FP of a camera parameter (in this embodiment, the origin of the camera coordinate). The 3D point P2 is located on the straight line.

Subsequently, the CPU 140 calculates residual angle errors concerning a respective pair of 3D points P1 and P2 corresponding to each other (S530). That is, the CPU 140 calculates, concerning the respective pair of 3D points, angles formed by the 3D point P1 and the 3D point P2. The respective angle errors are inferred concerning a pair of corresponding points from dot products (inner products) of unit vectors extending along camera beams (straight lines) coupled to the respective 3D frame points P1 and P2 from the focal point FP.

Subsequently, the CPU 140 calculates simple statistical data targeting the residual angle errors calculated as explained above and stores the statistical data as global angle error thresholds (hereinafter, residual angles) (S540). The statistical data is a total, an average, a median, a maximum, and the like.

Subsequently, the CPU 140 increases or reduces the residual angles according to the number of frames (fps) per one second measured in frames (S550) and ends the residual angle determination processing. The increase or reduction is executed to make the residual angles invariable with respect to a frame rate of the camera. That is, the increase or reduction is executed to adjust the angle thresholds according to the frame rate. The residual angles are one of parameters indicating a drift amount.

The determination in S610 explained above is performed according to whether the residual angles determined as explained above are smaller than an angle value determined in advance as the first criterion. The same applies in S630 explained below. In the other embodiments, the determination may be performed according to whether the residual angles and the PnP inner/fraction achieve respective values determined in advance as the first criterion.

Adjustment of parameters of the first criterion (FLPV) and adjustment of parameters of the second criterion (SLPV) are empirical and are caused by optimizing a cost function that supports accuracy of a 3D pose. At the same time, a penalty is imposed on instantiation of error correction (an error correction block) used for reinitializing the tracker to the accurate pose state.

The CPU 140 executes step S610 on the basis of the second pose. When determining in S610 that the accuracy of the second pose falls below even the first criterion (NO in S610), the CPU 140 sets a flag in the pose lost state (S620) and proceeds to reinitialization processing (explained below) (S700).

When determining in S610 that the accuracy of the second pose meets the first criterion (YES in S610), the CPU 140 determines whether the tracking state meets the second criterion (S630). That is, the CPU 140 determines whether the accuracy of the pose (the second pose) at the current time meets the second criterion. Further, in other words, the CPU 140 determines whether the accuracy of the second pose in a captured image (a current image frame) at the current time meets the second criterion. The CPU 140 executes step S630 on the basis of the second pose. In S630, the verification of the residual angle error is based on whether the angle threshold determined as explained above is smaller than the second criterion.

When determining that the accuracy of the second pose falls below the second criterion (NO in S630), the CPU 140 sets a flag in the allowable pose state (S640) and proceeds to the reinitialization processing (S700).

When determining in S630 that the accuracy of the second pose meets the second criterion (YES in S630), the CPU 140 determines whether to end the tracking processing (S650). When not ending the tracking processing (NO in S650), the CPU 140 returns to S420. When ending the tracking processing (YES in S650), the CPU 140 ends the tracking processing. The end of the tracking processing is based on, for example, an instruction from the user.

Note that the accuracy of the second pose meeting the second criterion means that the tracking state is the accurate pose state. The pose detected as the second pose in S430 changes to a new first pose because it is confirmed that the tracking state is the accurate pose state. The first pose detected in this way is detected on the basis of a captured image at time later than the initial time.

Figure 10:
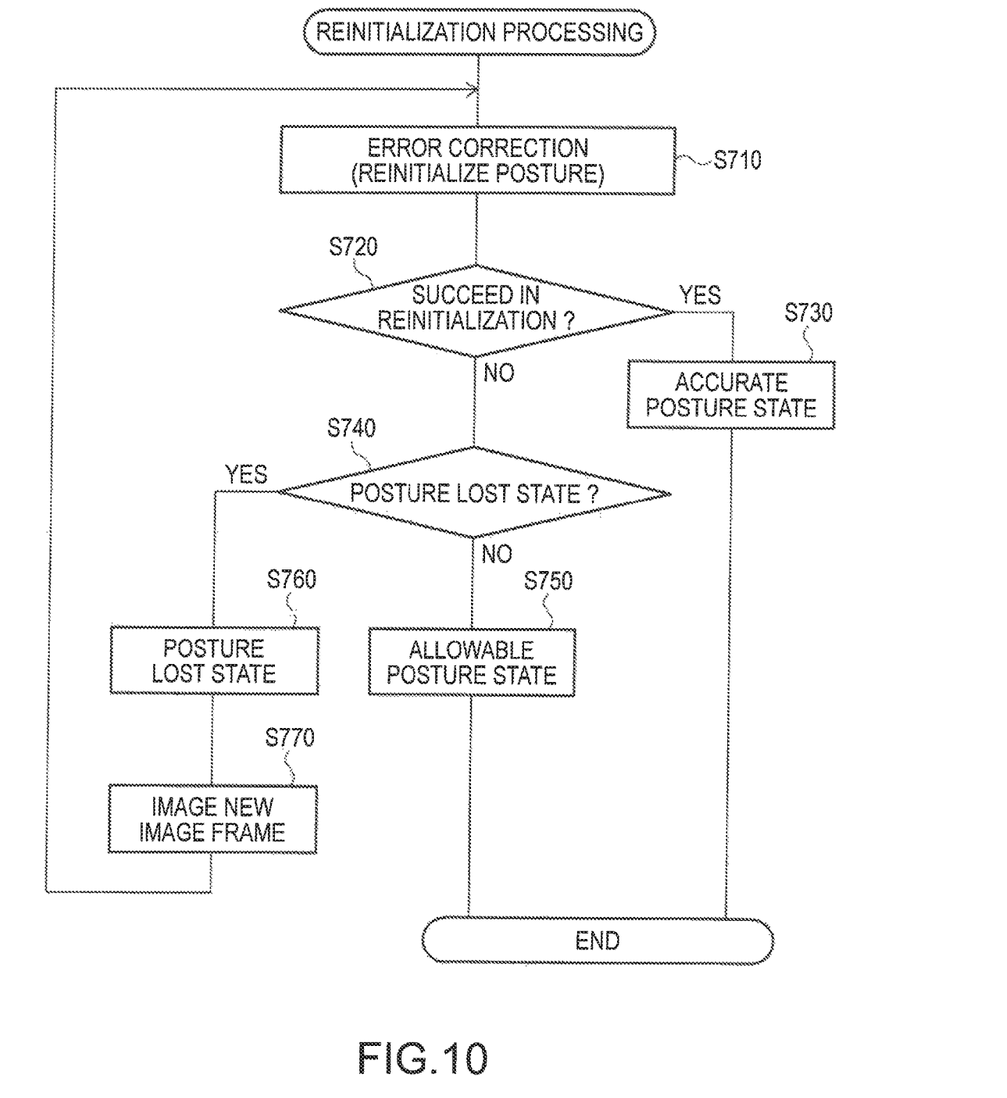
FIG. 10 is a flowchart for explaining reinitialization processing.

FIG. 10 is a flowchart for explaining the reinitialization processing. First, the CPU 140 executes error correction (S710). That is, the CPU 140 attempts reinitialization of a pose. The reinitialization is executed in the same manner as the initialization explained above. A pose detected by the reinitialization is referred to as third pose as well. The initialization (the reinitialization) includes searching through a plurality of 2D templates, that is, a plurality of views in a wide range. Therefore, the pose of the object OP is accurately derived even if tracking deviates or is lost because the pose of the object OP suddenly changes in a short time and/or the object OP once moves out from a visual field of the camera 60.

When succeeding in the reinitialization (YES in S720), since the tracking state changes to the accurate pose state, the CPU 140 sets a flag representing the accurate pose state (S730) and ends the reinitialization processing. The pose detected as the third pose in S710 changes to a new first pose when it is confirmed that the tracking state is the accurate pose state. The first pose detected in this way detected on the basis of a captured image at time later than the initial time. After ending the reinitialization processing, the CPU 140 returns to S420 as shown in FIG. 3. High accuracy tends to be maintained in the second pose subsequently derived immediately after the initialization (the reinitialization). Therefore, it is possible to cause the user to visually recognize as if a 3D pose of an AR image coincides with a 3D pose of the object OB. Note that, before returning to S420, the CPU 140 may display, on the display section, an AR image in the virtual pose corresponding to the first pose on an image frame corresponding to a point in time when the first pose (the third pose) is derived by the reinitialization.

When failing in the reinitialization (NO in S720), the CPU 140 determines whether the tracking state is the pose lost state (S740). That is, the CPU 140 determines whether the accuracy of the third pose is less than the first criterion. When the tracking state is not the pose lost state (NO in S740), the tracking state changes to the allowable pose state. Therefore, the CPU 140 sets a flag representing the allowable pose state (S750) and ends the reinitialization processing.

When the tracking state is the pose lost state (YES in S740), the CPU 140 sets a flag in the pose lost state (S760), images a new image frame (S770), and returns to S710. That is, the CPU 140 attempts the reinitialization again.

Figure 11:
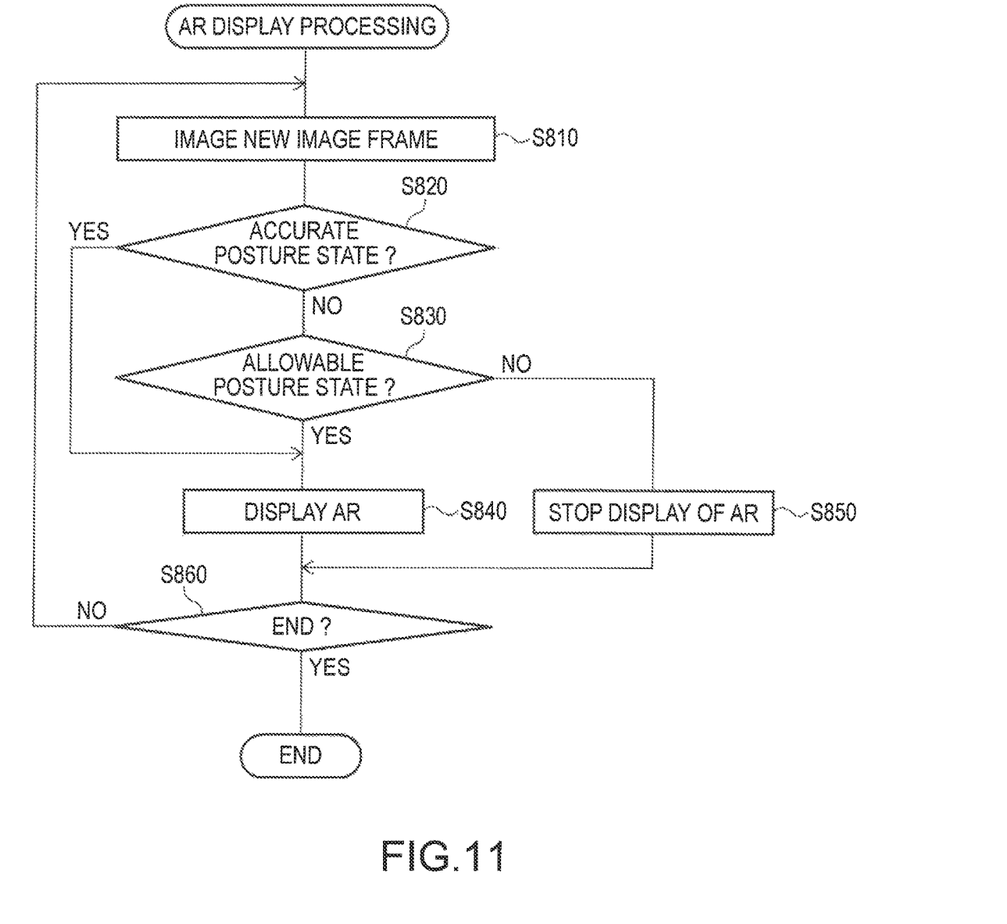
FIG. 11 is a flowchart for explaining AR display processing.

FIG. 11 is a flowchart for explaining AR display processing. An execution entity of steps included in the AR display processing is the CPU 140. The AR display processing is processing for executing and stopping display of AR. Contents of a part of steps of the AR display processing are the same as the contents of the steps included in the tracking processing. That is, the tracking processing and the AR display processing are not executed independently from each other and share a part of the processing.

In the part of the steps, step numbers shared by the AR display processing and the tracking processing are shown in angle parentheses. Note that the initialization (S410) in the tracking processing is regarded as being already carried out before the start of the AR display processing.

First, the CPU 140 images a new image frame (S810<S420>). Subsequently, the CPU 140 determines whether the tracking state is the accurate pose state (S820<S630)). When the tracking state is not the accurate pose state (NO in S820), the CPU 140 determines whether the tracking state is the allowable pose state (S830<S610>). When the tracking state is the allowable pose state (YES in S830) or when the tracking state is the accurate pose state (YES in S820), the CPU 140 displays AR (S840).

Both of the AR displayed when the tracking state is the accurate pose state and the AR displayed when the tracking state is the allowable pose state are images displayed in a virtual pose based on the second pose.

When the tracking state is the allowable pose state, the CPU 140 executes the reinitialization processing as explained above. Therefore, when the tracking state is the allowable pose state, the CPU 140 executes the reinitialization processing while displaying an AR image in the virtual pose based on the second pose. Consequently, it is possible to improve the accuracy through the reinitialization before accuracy of a 3D pose of the AR image is deteriorated to a degree unallowable for the user. During a period of the reinitialization started before the accuracy is deteriorated to the degree unallowable for the user, the display of the AR image is maintained. Therefore, it is possible to reduce a time in which AR superimposition disappears.

On the other hand, when the tracking state is not the allowable pose state (NO in S830), the CPU 140 stops the display of the AR (S850). After S840 or S850, the CPU 140 determines whether to end the AR display processing (S860<S650>). When not ending the AR display processing (NO in S860), the CPU 140 returns to S810. When ending the AR display processing (YES in S860), the CPU 140 ends the AR display processing. The end of the AR display processing is based on, for example, an instruction from the user.

The disclosure is not limited to the embodiments, the examples, and the modifications explained in this specification and can be realized in various forms without departing from the spirit of the disclosure. For example, the technical features in the embodiments, the examples, and the modifications corresponding to the technical features in the forms described in the summary can be replaced or combined as appropriate in order to solve a part or all of the problems or achieve a part or all of the effects. Unless the technical features are explained in this specification as essential technical features, the technical features can be deleted as appropriate. For example, technical features explained below are illustrated.

In the embodiment explained above, a part or all of the functions and the processing realized by software may be realized by hardware. A part or all of the functions and the processing realized by hardware may be realized by software. As the hardware, various circuits such as an integrated circuit, a discrete circuit, and a circuit module obtained by combining the circuits may be used.

The display device that executes the tracking processing and the AR display processing may be a video see-through-type HMD or may be not the HMD (head mounted display. Other than the HMD, the display device may be applied to a robot. The display device may be a portable display device (e.g., a smartphone), may be a head-up display (HUD), or may be a stationary display device.

The entire disclosure of Japanese Patent Application No. 2016-193867, filed on Sep. 30, 2016, is expressly incorporated by reference herein.

What is claimed is:

1. A non-transitory computer readable medium storing instructions causing one or more processors to perform steps comprising:
    acquiring a captured image of an object with a camera;
    deriving a first pose of the object with respect to the camera on the basis of 2D template data and either the captured image at initial time or the captured image at a first time later than the initial time;
    deriving a second pose of the object corresponding to the captured image at a second time later than the first time based on the first pose and the captured image at the second time;
    displaying, on a display, an AR image in a virtual pose based on the second pose in the case where accuracy of the second pose corresponding to the captured image at the second time falls in a range equal to or greater than a first criterion; and
    deriving a third pose of the object based on the captured image at the second time and the 2D template data in the case where the accuracy falls below a second criterion, wherein
    accuracy represented by the first criterion is more tolerant than the second criterion.

2. The non-transitory computer readable medium according to claim 1, further comprising:
    stopping display of the AR image in the case where the accuracy of the second pose falling below the second criterion.

3. The non-transitory computer readable medium according to claim 1, wherein:
    the display device is a head-mounted display device including the camera, the one or more processors and the display section,
    the display includes a display element and an optical element enabling a user to visually perceive the AR image displayed by the display element to be superimposed on a real scene, the method further comprising;
    displaying the AR image so that the virtual pose of the AR image is visually perceived by the user to be aligned with the object in the real scene.

4. A method performed by a display device having a camera and a display, the display device being configured to acquire a captured image of an object with the camera, the method comprising:
    deriving a first pose of the object with respect to the camera based on 2D template data and either the captured image at initial time or the captured image at a first time after the initial time;
    deriving a second pose of the object corresponding to the captured image at a second time later than the first time based on the first pose and the captured image at the second time;
    displaying, on a display, an AR image in a virtual pose based on the second pose in the case where accuracy of the second pose corresponding to the captured image at the second time falls in a range equal to or greater than a first criterion; and
    deriving a third pose of the object on the basis of the captured image at the second time and the 2D template data in the case where the accuracy falls below a second criterion, wherein
    accuracy represented by the first criterion is more tolerant than the second criterion.

5. A display device comprising:
a camera;
a display; and
one or more processors configured to:
  acquire a captured image of an object with the camera;
  derive a first pose of the object with respect to the camera based on 2D template data and either the captured image at initial time or the captured image at a first time after the initial time;
  derive a second pose of the object corresponding to the captured image at a second time later than the first time based on the first pose and the captured image at the second time;
  display, on the display, an AR image in a virtual pose based on the second pose in the case where accuracy of the second pose corresponding to the captured image at the second time falls in a range equal to or greater than a first criterion; and
  derive a third pose of the object on the basis of the captured image at the second time and the 2D template data in the case where the accuracy falls below a second criterion, wherein
accuracy represented by the first criterion is more tolerant than the second criterion.

* * * * *